Sept. 19, 1950          R. V. LUKES          2,522,524
METHOD OF MAKING SEALING GLASSES
Original Filed June 24, 1946
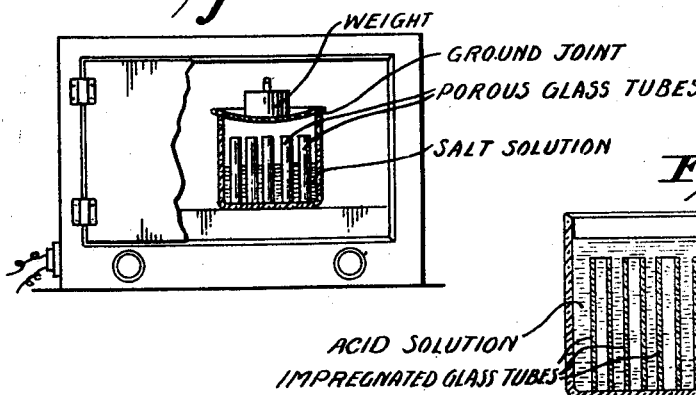
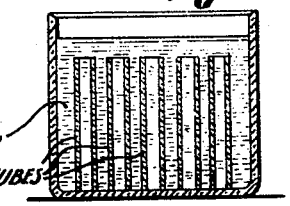
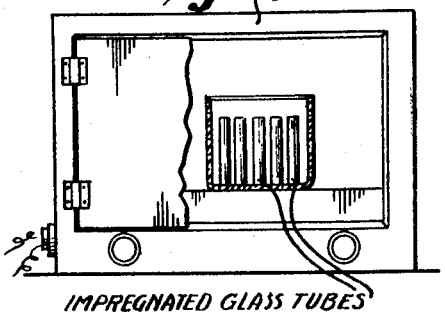
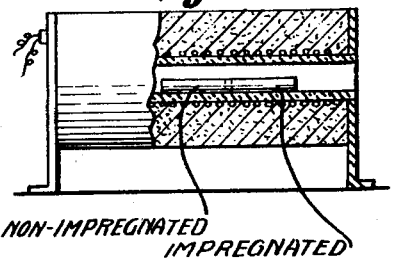
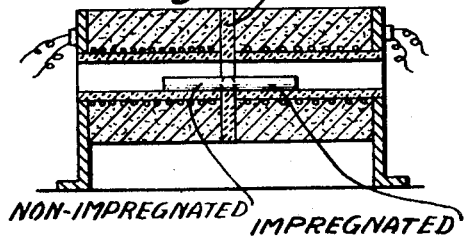
Inventor
ROBERT V. LUKES
By Rolf E. Schneider
Attorney Patented Sept. 19, 1950

2,522,524

UNITED STATES PATENT OFFICE 2,522,524

METHOD OF MAKING SEALING GLASSES

Robert V. Lukes, Corning, N. Y., assignor to Corning Glass Works, Corning, N. Y., a corporation of New York Original application June 24, 1946, Serial No. 678,765. Divided and this application September 19, 1949, Serial No. 119,327

11 Claims. (Cl. 49—79)

This invention relates to glasses which are suitable for forming thermal seals between fused silica or high silica glasses and metals or between fused silica or high silica glasses and other glasses of higher thermal expansion coefficients. This application is a division of my pending application Serial Number 678,765, filed June 24, 1946.

The primary object of this invention is to provide glasses having thermal expansion coefficients intermediate those of fused silica and ordinary silicate glasses.

Another object is to provide graded glass seals.

Another object is to provide glass articles having graded expansion coefficients ranging from about .0000008 to .0000020 cm. per cm. per degree C. and higher between 0° and 300° C.

Another object is to provide graded glass seals which are mechanically strengthened by surface compressional stresses.

Another object is to provide a simple and easy method of making such glasses and graded seals.

In the Patent 2,336,227 issued December 7, 1943, to Robert H. Dalton and assigned to the assignee of this application, a method of making sealing glasses is described which comprises impregnating a porous high silica glass with a solution or solutions containing glass making materials, which on firing are converted to colorless glass-forming oxides other than silica, such as, oxides of boron, alkali metals, alkaline earth metals, etc., and thereafter firing the impregnated glass to close the pores and incorporate such oxides into the glass as a part of its composition, whereby the thermal expansion coefficient of the high silica glass is increased and its softening point is modified to a desired extent. The porous high silica glass is prepared by a well known process described in Patent 2,106,744, issued February 1, 1938, to Harrison P. Hood and Martin E. Nordberg, and comprising leaching non-siliceous constituents from a glass to leave a porous highly siliceous glass having intercommunicating pores throughout and a silica content of at least 94%. Before firing the impregnated glass it is necessary to dry it, during which time the soluble salts within the pores have a tendency to "creep" or to become more concentrated in the outer portion of the glass thereby establishing differential stresses between the outer and inner portions of the article when it is subsequently fired. Such differential stresses comprise a tensional stress at the surface with a corresponding compressional stress in the interior of the glass, which condition promotes breakage.

I have now found that this difficulty may be avoided by impregnating the porous glass as above described and thereafter removing at least a part of the impregnant within the pores at or near the surface as by solvent extraction, after which the article is dried and fired to close the pores and incorporate the impregnating materials into the glass without the development of objectionable stresses. In fact, the stress condition is reversed and a small compressional stress is developed in the surface of the glass, which improves its mechanical strength.

More specifically, the new process comprises immersing at least a part of the article in a solution containing a suitable glass making material until the pores are filled with the solution immersing the impregnated part in a solvent for such glassmaking material, preferably a hot dilute solution of an acid, for about 1 to 2 minutes per mm. of glass thickness, drying the article and firing it to close the pores and incorporate the material into the glass. The incorporation of such materials into the glass increases its thermal expansion coefficient.

Glass making materials which are suitable for my purpose are soluble materials or salts which may be combined with silica to form glass, such as boric acid, borax and alkali metal borates, the carbonates and nitrates of the alkali metals, etc. For some purposes glass coloring materials such as salts of cobalt, nickel, chromium, etc., may be included. Chlorides and acetates are not entirely suitable. Chlorides may not be entirely converted to the corresponding metal oxides and residual chloride in the glass may cause objectionable bubbling when the glass is subsequently flame worked. Acetates may leave a slight carbonaceous residue in the glass which may result in bubbling when the glass is flame worked. Water is preferable as the solvent, but other solvents may be employed if desired. It is advantageous to use a weakly basic solution when boric acid or alkali metal borates are present because their solubility is thereby substantially increased. Ammoniacal solutions are suitable. Such solutions readily lose ammonia, particularly when maintained near their boiling points and it is preferable to use them in covered containers. Ammonia or solvent which is lost by evaporation may be replenished either by reflux or by periodic additions thereof. If the cover fits closely and is weighted or otherwise sealed, the heated solution may develop a pressure which is somewhat above atmospheric pressure. Ammoniacal or alkaline solutions may have a corrosive effect on the porous glass and I have found that such corrosive effect may be practically nullified by substantially saturating the solution with silica. This may be done by adding a small amount of a soluble form of silica such as sodium silicate or porous glass cullet or silica gel. A slight turbidity of flocculent silica in solution indicates saturation. A larger excess of silica does no harm but is of no advantage.

For the subsequent removal of the soluble materials from the surface or outer portion of the glass prior to drying it, the impregnated portion is immersed in a suitable solvent for such materials such as water which is preferably acidified with a strong acid, particularly when the impregnating solution is alkaline, such as hydrochloric acid, nitric acid, sulfuric acid, etc. A 1% solution of acid is suitable, but stronger or weaker solutions may also be used. The length of time of immersion will depend upon the temperature of the solution, which preferably should be hot, and upon the depth to which the surface pores are to be leached. It is desirable to leach to such a depth that the concentration of soluble salts in the surface portion after subsequent drying will be no greater and preferably will be less than that in the interior of the glass. The latter condition produces after firing a compressional stress in the surface portion of the article, due to the lower thermal expansion coefficient of the surface portion as compared to the interior. The differential stresses may readily be measured by optical methods in the usual manner. I have found that the desired condition is attained at a temperature near the boiling point of the solution if the immersion time is one to two minutes for a glass thickness of about 1 mm. Longer times are required as the thickness is increased or the temperature of the solution is decreased.

In order that the invention may be better understood, reference is had to the accompanying drawing which illustrates a simple form of an apparatus for making tubular graded seals as one embodiment of the invention and in which Fig. 1 is a side view partly in section of an oven in which is disposed for heating a glass jar having a cover with a ground joint. Within the jar is a solution of colorless glass making materials and partly immersed therein are a number of porous glass tubes to be impregnated.

Fig. 2 is a sectional view of a glass jar containing a dilute acid solution in which impregnated porous glass tubes are immersed for the purpose of leaching out some of the impregnating material from the pores in the surface of the glass.

Fig. 3 is a side view partly in section of a drying oven within which is a glass jar containing impregnated and leached porous glass tubes to be dried.

Fig. 4 is a sectional view of a tubular electric resistance furnace containing dried impregnated porous glass tubes to be preliminarily fired; and Fig. 5 is a sectional view of a tubular furnace having zones of different temperatures separated by refractory insulation and containing in position for firing a porous glass tube one end of which has been impregnated.

In practicing the invention the porous glass articles, for example porous glass tubes to be converted to graded seals, are impregnated by immersing them for a portion of their length in a solution containing a soluble glass making material the oxide of which is to be incorporated therein as shown in Fig. 1. Preferably the solution is heated to increase the solubility of the material and to facilitate the impregnation. Sufficient time should be allowed to permit the pores to become completely filled with the solution and for a tube having a wall thickness of about 1 mm. I have found that 2 hours is sufficient for complete impregnation.

The impregnated tubes are then immersed in a suitable solvent for the soluble glassmaking material, preferably hot water acidulated with about 1% by weight of a strong acid to leach a part of the material from the pores in the surface of the glass as shown in Fig. 2. As stated above, the time of immersion required to leach the pores to the desired depth is between 1 and 2 minutes for a glass thickness of about 1 mm. when the solvent is maintained near its boiling point.

After a brief rinsing in cold water, the impregnated porous glass tubes are heated in air slowly up to about 150° C. for a total of at least one hour, to dry them as shown in Fig. 3.

The dried impregnated tubes are then transferred to an electric resistance furnace in which they are heated for about nine or ten hours up to about 550° C., and for about two hours up to about 725° C., as shown in Fig. 4. This eliminates volatile substances from the pores and sinters the impregnated parts.

The tubes are finally transferred individually to a furnace with two temperature zones as shown in Fig. 5, in which the impregnated and unimpregnated portions are fired simultaneously. The impregnated portion is heated at about 900–1000° C., and the unimpregnated portion is heated at about 1300–1350° C. At these temperatures consolidation requires only about two minutes, but lower or higher temperatures may be employed, if desired, with correspondingly different times. Alternatively, the impregnated and the unimpregnated ends may be fired individually.

Porous glass tubes having a length of about 4 inches, a diameter of about .5 inch and a wall thickness of about 1 mm. may be treated by the above described process using impregnating solutions having the compositions set forth in the following examples which illustrate but do not limit the invention:

*Example 1*

| | | |
|---|---|---|
| $H_3BO_3$ | grams | 421 |
| $Na_2B_4O_7$ (anhydrous) | do | 230 |
| $NH_4OH$ (28% solution) | cc | 167 |

Water sufficient to make 1 liter of solution.

*Example 2*

| | | |
|---|---|---|
| $H_3BO_3$ | grams | 482 |
| $Na_2B_4O_7$ (anhydrous) | do | 178 |
| $K_2CO_3 \cdot 1.5\ H_2O$ | do | 41 |
| $NH_4OH$ (28% solution) | cc | 167 |

Water sufficient to make 1 liter of solution.

*Example 3*

| | | |
|---|---|---|
| $H_3BO_3$ | grams | 8.3 |
| $KB_5O_8 \cdot 4H_2O$ | do | 667 |
| $Na_2B_4O_7$ (anhydrous) | do | 58.4 |
| $NH_4OH$ (28% solution) | cc | 167 |
| Sodium silicate solution ($Na_2O + 3.36\ SiO_2$, sp. gr. 1.395) | cc | 16.7 |

Water sufficient to make 1 liter of solution.

*Example 4*

| | | |
|---|---|---|
| $KB_5O_8 \cdot 4H_2O$ | grams | 667 |
| $K_2B_4O_7 \cdot 5H_2O$ | do | 83 |
| $LiNO_3 \cdot 3H_2O$ | do | 342 |
| $NH_4OH$ (28% solution) | cc | 167 |

Water sufficient to make 1 liter of solution.

A porous glass tube, one end of which has been impregnated with any one of the above described solutions followed by drying and firing the tube as described above, is suitable for use as a graded seal between fused silica or glass comprising over 94% $SiO_2$ and low expansion borosilicate glasses. The thermal expansion coefficients of the impregnated ends of such tubes when finished are in the neighborhood of .0000030 cm. per cm. per degree C. in the range of 0° to 300° C.

Other procedures for carrying out the various steps of the process will suggest themselves to those skilled in the art and different temperatures and times and solutions of different compositions from those set forth above may be employed within the scope of the claims.

I claim:

1. The method of treating an article composed of a glass containing at least 94% $SiO_2$ and having intercommunicating pores throughout its mass, which comprises impregnating at least a part of the article with a solution containing a compound of a glass-making oxide to substantially fill the pores therein, immersing the impregnated part in a solvent for the compound to remove part of the compound from the surface portion thereof, drying the article and firing it to close the pores and incorporate the oxide into the glass.

2. The method of treating an article composed of a glass containing at least 94% $SiO_2$ and having intercommunicating pores throughout its mass, which comprises impregnating at least a part of the article with a solution containing a compound of a glass-making oxide to substantially fill the pores therein, immersing the impregnated part in an acidic solvent for the compound to remove part of the compound from the surface portion thereof, drying the article and firing it to close the pores and incorporate the oxide into the glass.

3. The method of treating an article composed of a glass containing at least 94% $SiO_2$ and having intercommunicating pores throughout its mass, which comprises impregnating at least a part of the article with an alkaline solution containing a compound of a glass-making oxide to substantially fill the pores therein, immersing the impregnated part in an acidic solvent for the compound to remove part of the compound from the surface portion thereof, drying the article and firing it to close the pores and incorporate the oxide into the glass.

4. The method of treating an article composed of a glass containing at least 94% $SiO_2$ and having intercommunicating pores throughout its mass, which comprises impregnating at least a part of the article with an aqueous solution containing a compound of boron oxide to substantially fill the pores therein, immersing the impregnated part in an acidic solvent for the compound to remove part of the compound from the surface portion thereof, drying the article and firing it to close the pores and incorporate the boron oxide into the glass.

5. The method of treating an article composed of a glass containing at least 94% $SiO_2$ and having intercommunicating pores throughout its mass, which comprises impregnating at least a part of the article with an aqueous solution containing a compound of boron oxide and a compound of an alkali metal oxide to substantially fill the pores therein, immersing the impregnated part in an acidic solvent for the compounds to remove part of the compounds from the surface thereof, drying the article and firing it to close the pores and incorporate the boron oxide and alkali metal oxide into the glass.

6. The method according to claim 5 in which the impregnating solution is an aqueous ammoniacal solution saturated with silica and containing a compound of boron oxide and a compound of an alkali metal oxide.

7. The method according to claim 2 in which the acidic solvent is maintained at an elevated temperature.

8. The method according to claim 2 in which the acidic solvent is maintained at substantially its boiling point and the impregnated part is immersed in such solvent for 1 to 2 minutes per mm. of glass thickness.

9. The method according to claim 4 in which the impregnating solution is an aqueous ammoniacal solution containing a compound of boron oxide.

10. The method according to claim 4 in which the impregnated solution is an aqueous ammoniacal solution saturated with silica and containing a compound of boron oxide.

11. The method according to claim 5 in which the proportion of boron oxide is larger than the proportion of alkali metal oxide.

ROBERT V. LUKES.

REFERENCES CITED

The following references are of record in the file of this patent:

UNITED STATES PATENTS

| Number | Name | Date |
|---|---|---|
| 2,336,227 | Dalton | Dec. 7, 1943 |